(12) United States Patent
Torigoe et al.

(10) Patent No.: US 7,172,787 B2
(45) Date of Patent: Feb. 6, 2007

(54) METHOD OF REPAIRING A NI-BASE ALLOY PART

(75) Inventors: Taiji Torigoe, Hyogo-ken (JP); Ikuo Okada, Hyogo-ken (JP); Kouji Takahashi, Hyogo-ken (JP); Minoru Ohara, Hyogo-ken (JP); Kengo Yamaguchi, Hyogo-ken (JP); Sunao Aoki, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/733,269

(22) Filed: Dec. 12, 2003

(65) Prior Publication Data
US 2004/0126486 A1    Jul. 1, 2004

Related U.S. Application Data

(63) Continuation of application No. PCT/JP02/05904, filed on Jun. 13, 2002.

(30) Foreign Application Priority Data
Jun. 13, 2001    (JP)    ............... 2001-179052

(51) Int. Cl.
 B05C 13/00    (2006.01)
 B05D 3/10    (2006.01)
 B05D 1/36    (2006.01)
(52) U.S. Cl. ............ 427/142; 427/307; 427/419.2; 427/421.1
(58) Field of Classification Search ............ 427/140, 427/142, 421, 427, 402, 404–405, 419.1, 427/248.1, 250, 252, 446, 453–455
See application file for complete search history.

(56) References Cited

U.S. PATENT DOCUMENTS 6,274,193 B1 *    8/2001    Rigney et al. ............ 427/142

(Continued)

FOREIGN PATENT DOCUMENTS

EP    1085109 A1 *    3/2001

(Continued)

OTHER PUBLICATIONS

Techno consultants Inc, Japan Thermal Spraying Society, pp. 337-339 and 357-360, "Handbook of Japan Thermal Spraying", Mar. 31, 1986.

(Continued)

Primary Examiner—Timothy Meeks
Assistant Examiner—David Turocy
(74) Attorney, Agent, or Firm—Oblon, Spivak, McClelland, Maier & Neustadt, P.C.

(57) ABSTRACT

The present invention relates to a method of repairing a Ni-based alloy part having an undercoat layer and a topcoat layer stacked on a Ni-based alloy base when the topcoat layer is damaged, comprising the steps of removing a peeled-off portion of the damaged topcoat layer and a denatured portion of the undercoat layer corresponding to the peeled-off portion, forming another undercoat layer by applying spraying to an opening portion of the undercoat layer in the atmosphere at a spray particle speed of 300 m/s or more and a base-material temperature of 300° C. or less, and forming another topcoat layer in the peeled-off portion of the topcoat layer

9 Claims, 4 Drawing Sheets

U.S. PATENT DOCUMENTS

| | | |
|---|---|---|
| 6,333,118 B1 * | 12/2001 | Alperine et al. ............. 428/469 |
| 6,485,780 B1 * | 11/2002 | Sangeeta et al. ............ 427/180 |
| 2002/0164417 A1 * | 11/2002 | Khan et al. ................. 427/140 |

FOREIGN PATENT DOCUMENTS

| | | |
|---|---|---|
| EP | 1 122 329 A1 | 8/2001 |
| JP | 3-79749 | 4/1991 |
| JP | 4-32546 | 2/1992 |
| JP | 6-88197 | 3/1994 |
| JP | 8-284604 | 10/1996 |
| JP | 9-176821 | 7/1997 |
| JP | 11-293452 | 10/1999 |

OTHER PUBLICATIONS

Edited by Japan Thermal Sprayinng Society, "Yosha Gijutsu Handbook", Shin Gijutsu Kaihatsu Center, May 30, 1998, p. 139, tables 3, 6.

* cited by examiner

METHOD OF REPAIRING A NI-BASE ALLOY PART

CROSS-REFERENCE TO RELATED APPLICATIONS

This is a Continuation Application of PCT Application No. PCT/JP02/05904, filed Jun. 13, 2002, which was not published under PCT Article 21(2) in English.

This application is based upon and claims the benefit of priority from the prior Japanese Patent Application No. 2001-179052, filed Jun. 13, 2001, the entire contents of which are incorporated herein by reference.

BACKGROUND OF THE INVENTION

1. Field of the Invention

The present invention relates to a method of repairing a Ni-based alloy part, and more particularly, to a method of repairing a Ni-based alloy part to be used in high-temperature components, specifically, components in such machines as gas turbines and jet engines, and more specifically, rotor blades and stator vanes.

2. Description of the Related Art

As is known well, rotor blades and stator vanes generally employ casting alloys. Of these alloys, in particular, Ni-based alloys are frequently used. Since Ni-based alloys have great flexible moldability, the parts made of Ni-based alloys may be easily manufactured and partially repaired.

FIG. 4 is a schematic view of a rotor blade 1 of a gas turbine and FIG. 5 is an enlarged sectional view of the damaged portion X shown in FIG. 4. As shown in FIG. 5, an undercoat layer 3 and a topcoat layer 4 formed of, for example, a $ZrO_2$-based ceramic, are sequentially formed on a base material 2. Part of the topcoat layer 4 is peeled off. The peeled-off portion is called a thermal barrier coating (TBC) peeled-off portion 5. It should be noted that reference numeral 6 in FIG. 5 indicates a denatured portion of the surface of the undercoat layer 4 formed at a position corresponding to the peeled-off portion 5, and reference numeral 7 indicates a damaged portion formed on the topcoat layer 4 around the peeled-off portion 5.

Such a TBC peeled-off portion may possibly be repaired by the low-pressure plasma spray method. However, this method entails cleaning (by a reversed polarity arc) and preheating at a temperature exceeding 800° C. If the method is used for partial repair, the topcoat layer 4 may be damaged. For the reason, the plasma spray method is never employed.

Conventionally, a TBC peeled-off portion is repaired by entirely removing the topcoat layer 4 and undercoat layer 3 mechanically and chemically, followed by forming another undercoat layer by the low-pressure plasma spray method and another topcoat layer by the atmospheric-pressure plasma spray method or the like.

However, in such a conventional repairing method, even if the top coating layer 4 is only partially damaged, the entire rotor blade must be coated again, which increases the cost.

BRIEF SUMMARY OF THE INVENTION

The present invention has been conceived taking the aforementioned circumstances into consideration. An object of the present invention is to provide a method of repairing a Ni-based alloy part, comprising: removing a damaged portion of a topcoat layer and the denatured portion of an undercoat layer corresponding to the damaged portion; forming another undercoat layer in the removed portion where the original undercoat layer has been removed by spraying performed in the atmosphere at a spray particle speed of 300 m/s or more and a base-material temperature of 300° C. or less; and forming another topcoat layer in the damaged portion of the topcoat layer, whereby the coat layers can be partially repaired, enabling cost reduction.

Another object of the present invention is to provide a method of repairing a Ni-based alloy part, comprising: removing a damaged portion of a topcoat layer and the denatured portion of an undercoat layer corresponding to the damaged portion; forming another undercoat layer in the removed portion where the original undercoat layer has been removed by spraying performed at reduced pressure, a spray particle speed of less than 300 m/s, and a base-material temperature of 600° C. or less; and forming another topcoat layer in the damaged portion of the topcoat layer, whereby the coat layers can be partially repaired, enabling cost reduction.

To attain the aforementioned objects, a method of repairing a Ni-based alloy part according to the present invention is employed. More specifically, there is provided a method of repairing a Ni-based alloy part having an undercoat layer and a topcoat layer stacked on a Ni-based alloy base when the topcoat layer is damaged, comprising the steps of: removing a damaged portion of the topcoat layer and a denatured portion of the undercoat layer corresponding to the damaged portion; forming another undercoat layer in the removed portion where the original undercoat layer has been removed by spraying performed in the atmosphere at a spray particle speed of 300 m/s or more and a base-material temperature of 300° C. or less; and forming another topcoat layer in the damaged portion of the topcoat layer.

Furthermore, the method of repairing a Ni-based alloy part according to the present invention is the one for repairing a Ni-based alloy part having an undercoat layer and a topcoat layer stacked on a Ni-based alloy base when the topcoat layer is damaged, comprising the steps of: removing a damaged portion of the topcoat layer and the denatured portion of the undercoat layer corresponding to the damaged portion; applying spraying to the removed portion where the undercoat layer has been removed, at reduced pressure, a spray particle speed of less than 300 m/s, and a base-material temperature of 600° C. or less; and forming another topcoat layer in the damaged portion of the topcoat layer.

DETAILED DESCRIPTION OF THE INVENTION

Figure 1A:
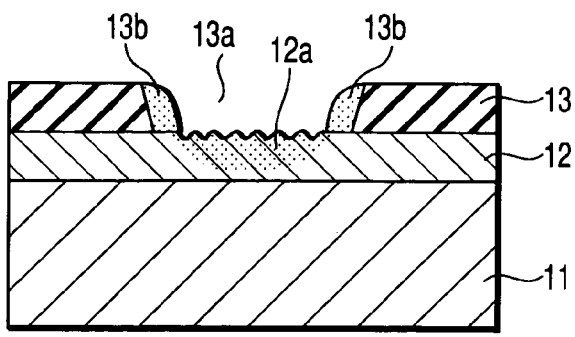
FIGS. 1A to 1D illustrate a method of repairing a Ni-based alloy part according to Embodiment 1 of the present invention, in accordance with order of repairing steps.
Figure 1B:
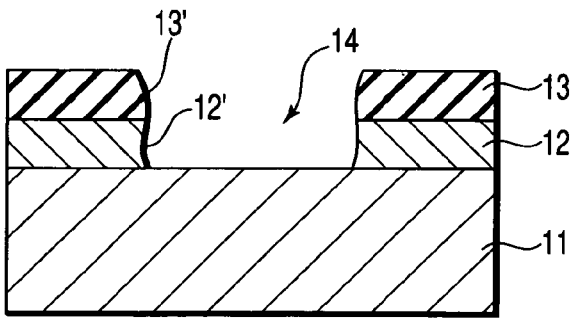
Figure 1C:
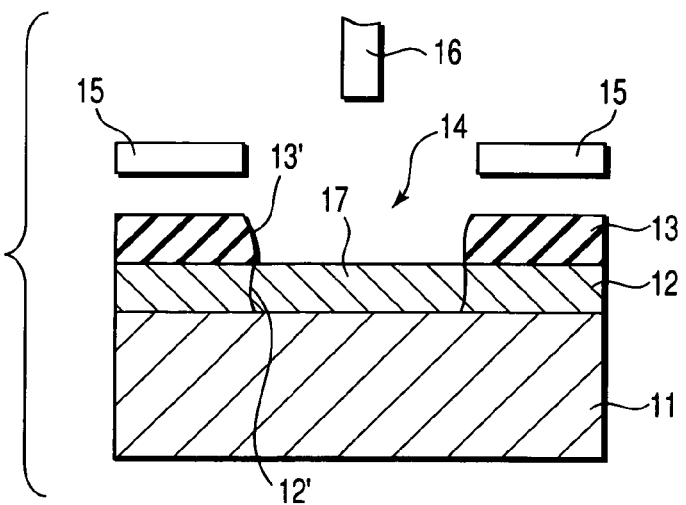
Figure 1D:
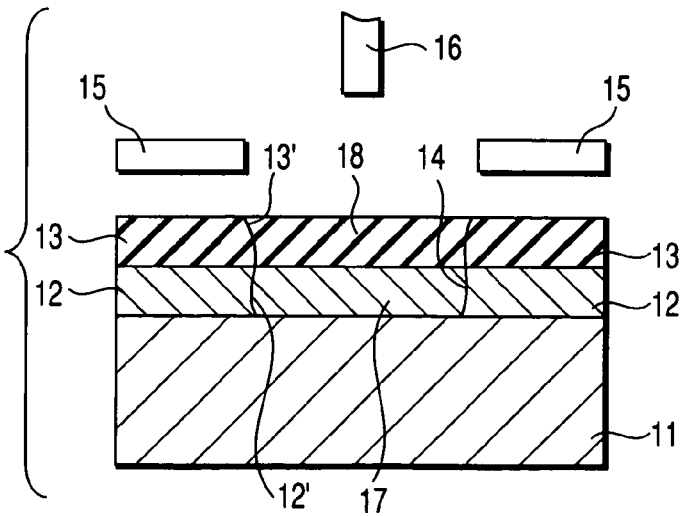

The present invention will now be explained in detail, below.

In the first aspect of the invention, the spray particle speed is set at 300 m/s or more. This is because if the spray particle speed is less than 300 m/s, an oxide film is easily deposited on another undercoat layer to be formed where the original undercoat layer has been removed. In addition, the base-material temperature is set at 300° C. or less. This is because if the temperature exceeds 300° C., the base material is damaged with heat.

In the second aspect of the invention, the spray particle speed is set at less than 300 m/s. This is because if the spray particle speed is 300 m/s or more, the energy density of the spray frame increases at low pressure, causing a substantial increase in the base-material temperature. Furthermore, the base-material temperature is set at 600° C. or less. This is because if the base-material temperature exceeds 600° C., the topcoat layer is subjected to an abrupt heat cycle and damaged.

In the first and second inventions, another undercoat layer to be formed in a damaged portion of the undercoat layer may be formed of, for example, a Ni-based alloy in contrast to the Co-based alloy (Co-32% Ni-21% Cr-8% Al-0.5% Y) conventionally used. As another topcoat layer to be formed where the original topcoat layer has been removed, a material such as $ZrO_2$—$Dy_2O_3$ and $ZrO_2$—$Yb_2O_3$ may be used in contrast to the $ZrO_2.8Y_2O_3$ conventionally used.

In the first and second inventions, as a means for forming another undercoat layer where the original undercoat layer has been removed, for example, plasma spraying through a spray gun may be used. Furthermore, as a means for forming another topcoat layer where the original topcoat layer has been damaged, direct plasma spraying by the plasma spray gun or deposition by an electron beam physical vapor deposition method (EB•PVD method) may be used. If the EB•PVD method is employed, the durability of the topcoat layer can be improved more.

According to the present invention, after the damaged portion of the topcoat layer and the denatured portion of the undercoat layer corresponding to the damaged portion are removed, another undercoat layer is formed where the original undercoat layer has been removed, by spraying performed in the atmosphere at a spray particle speed of 300 m/s or more and a base-material temperature of 300° C. or less, and then, another topcoat layer is formed in the damaged portion of the original topcoat layer. Owing to this method, partial repair of the coat layer can be attained, thereby reducing the cost.

Furthermore, according to the present invention, after a damaged portion of the topcoat layer and the denatured portion of the undercoat layer corresponding to the damaged portion are removed, another undercoat layer is formed where the original undercoat layer has been removed by spraying at reduced pressure, a spray particle speed of less than 300 m/s, and a base-material temperature of 600° C. or less, and another topcoat layer is formed in the damaged portion of the topcoat layer. Owing to this method, partial repair of the coat layer can be attained, thereby reducing the cost.

Now, methods of repairing a Ni-based alloy part will be explained in accordance with individual embodiments of the present invention. The materials, numerical values and so forth described in the following embodiments are merely examples, which will not limit the scope of the present invention.

(Embodiment 1)

Referring to FIGS. 1A to 1D, explanation will be made.

As shown in FIG. 1A, an undercoat layer 12 composed of a Co-based material (e.g., Co-32% Ni-21% Cr-8% Al-0.5% Y), which has a denatured portion 12a on its surface, is formed on a base material 11. Also as shown in FIG. 1A, a topcoat layer 13, which has a peeled-off portion (where the topcoat layer has been removed) 13a and a damaged portion 13b surrounding the peeled-off portion 13a, is formed on the undercoat layer 12. The topcoat layer 13 is composed of $ZrO_2.8Y_2O_3$. From the structure in this state, the undercoat layer 12 present on the bottom of the peeled-off portion 13a and the damaged portion 13b of the topcoat layer 13 are selectively removed by grind-polishing to form an opening portion 14 (where the coat layers have been removed) in the undercoat layer 12 and the topcoat layer 13 (see FIG. 1B). Note that reference numeral 12' of FIG. 1B indicates the portion where the undercoat layer 12 has been removed, and reference numeral 13' indicates the portion where the topcoat layer 13 has been removed.

Next, a masking material 15 having an opening corresponding to the opening portion 14 is arranged right upon the topcoat layer 13 and a plasma spray gun 16 is arranged right above the opening portion 14. Subsequently, plasma spray is applied to the opening 14 in the atmosphere at a spray particle speed of 500 m/s and a base-material temperature of 150° C. to form a Co-based alloy layer, e.g., CoNiCrAlY layer 17 in the removed portion 12' where the undercoat layer 12 has been removed. In this way, the repair of the undercoat layer 12 is completed (see FIG. 1C). Furthermore, plasma spraying is applied to the opening portion 14 by means of the plasma spray gun 16 to form a topcoat layer 18 composed of $ZrO_2$—$Yb_2O_3$ in the removed portion 13' where the topcoat layer 13 has been removed. In this way, the repair of the topcoat layer 13 is completed (see FIG. 1D).

In Embodiment 1, the undercoat layer 12 present on the bottom of the peeled-off portion 13a of the topcoat layer 13 and the damaged layer 13b are selectively removed to form the opening portion 14 in the undercoat layer 12 and the topcoat layer 13. Thereafter, plasma spraying is applied to the opening portion 14 right above it by means of the plasma spray gun 16 in the atmosphere at a thermal particle speed of 500 m/s and a base-material temperature of 150° C. or less. In this manner, the removed portion 12' of the undercoat layer 12 and the removed portion 13' of the topcoat layer 13 are sequentially repaired. Accordingly, since further coating of the entire rotor blade is not required as is in the art, the cost can be reduced.

Further in Embodiment 1, since a Ni-based alloy layer 17 is formed in the removed portion, where the undercoat layer 12 has been removed and exposed in the opening portion 14, the durability can be improved compared to a conventional undercoat layer 12. Furthermore, since the topcoat layer 18 composed of $ZrO_2$—$Yb_2O_3$ is formed in the removed portion 13a where the topcoat layer 13 has been removed, the durability can be improved compared to a conventional topcoat layer 13.

(Embodiment 2)

Referring to FIGS. 2A to 2D, explanation will be made. Like reference numerals are used to designate like structural elements corresponding to those like in FIGS. 1A to 1D and any further explanation is omitted for brevity's sake.

Figure 2A:
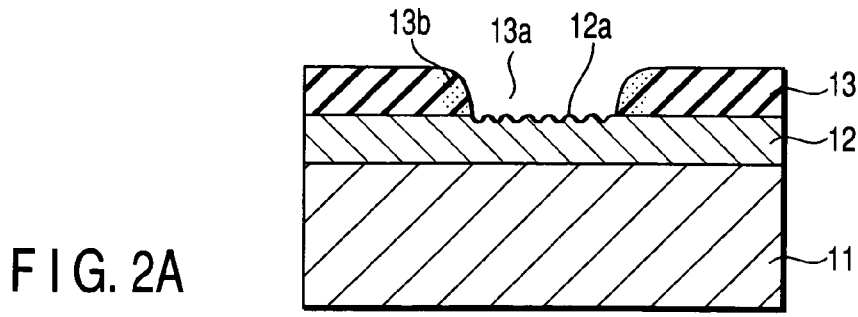
FIGS. 2A to 2D illustrate a method of repairing a Ni-based alloy part according to Embodiment 2 of the present invention, in accordance with order of repairing steps.

As shown in FIG. 2A, an undercoat layer 12 having a denatured portion 12a is formed on a base material 11. The undercoat layer 12 used herein is composed of a Ni-based material, for example, NiCoCrAlY. Furthermore, as shown in FIG. 2A, a topcoat layer 13, which has a peeled-off portion (removed portion) 13a and a damaged portion 13b surrounding the removed portion 13a, is formed on the undercoat layer 12. The topcoat layer 13 is composed of $ZrO_2.8Y_2O_3$.

Figure 2B:
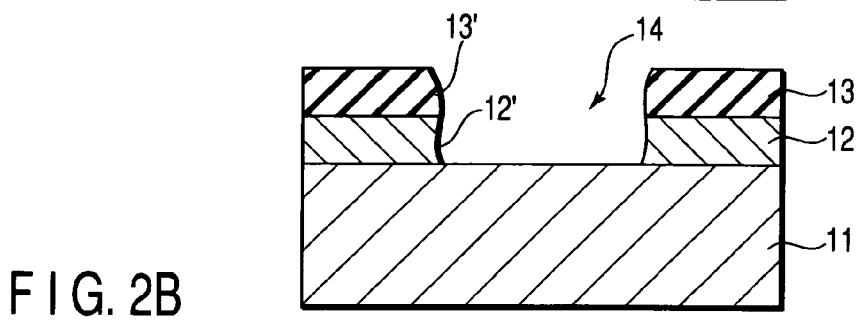
Figure 2C:
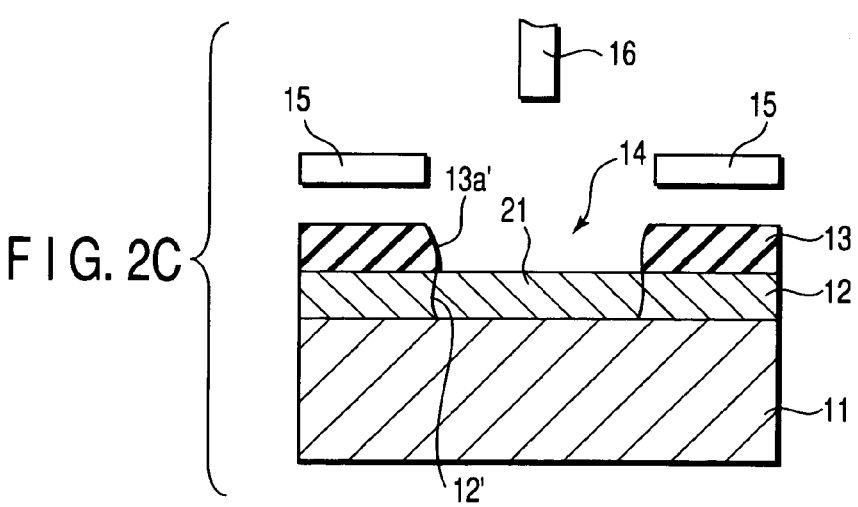
Figure 2D:
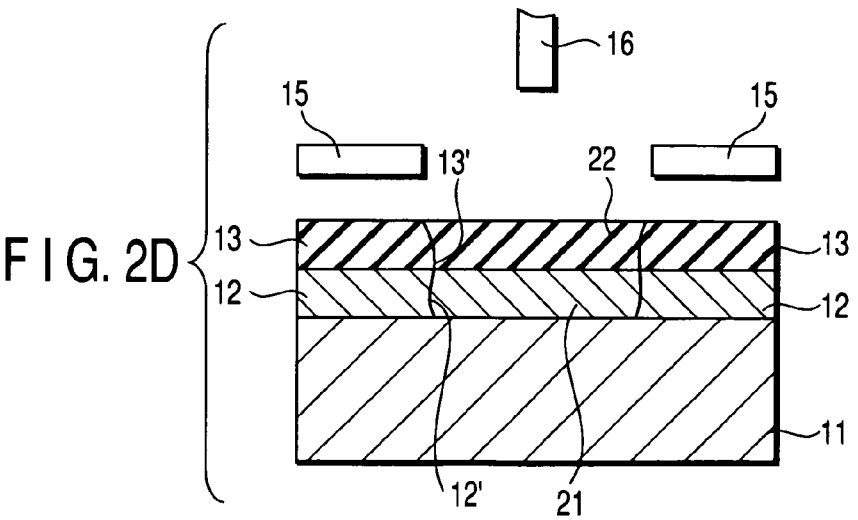

From the structure in this state, the undercoat layer 12 present on the bottom of the peeled-off portion 13a and the damaged portion 13b of the topcoat layer 13 are selectively removed by grind-polishing, thereby forming an opening portion 14 in the undercoat layer 12 and the topcoat layer 13 (see FIG. 2B).

Next, a masking material 15 having an opening corresponding to the opening portion 14 is arranged right upon the topcoat layer 13 and a plasma spray gun 16 is arranged right above the opening portion 14. Subsequently, plasma spraying is applied to the opening 14 at reduced pressure, a spray particle speed of 200 m/s, and a base-material temperature of 150° C. to form a Ni-based alloy layer, an NiCoCrAlY layer 21, in the removed portion 12' where the undercoat layer 12 has been removed. In this way, the repair of the undercoat layer 12 is completed (see FIG. 2C). Furthermore, spraying is applied to the opening portion 14 by means of a plasma spray gun 16 to form a topcoat layer 22 composed of $ZrO_2$—$Yb_2O_3$ in the removed portion 13' where the topcoat layer has been removed. In this way, the repair of the topcoat layer 13 is completed (see FIG. 2D).

According to Embodiment 2, the undercoat layer 12 present on the bottom of the peeled-off portion 13a of the topcoat layer 13 and the damaged layer 13b are selectively removed to form the opening portion 14 in the undercoat layer 12 and the topcoat layer 13. Thereafter, plasma spraying is applied to the opening portion 14 from right above by means of the spray gun 16 at reduced pressure, a plasma spray particle speed of 500 m/s, and a base-material temperature of 150° C. or less. In this manner, the removed portion 12' of the undercoat layer 12 and the removed portion 13' of the topcoat layer 13 are sequentially repaired. Accordingly, since further coating of the entire rotor blade is not required as is in the art, the cost can be reduced.

Further in Embodiment 2, since a Ni-based alloy layer 21 is formed in the removed portion, where the undercoat layer 12 has been removed and exposed in the opening portion 14, the durability can be improved compared to a conventional undercoat layer 12. Furthermore, since the topcoat layer 22 composed of $ZrO_2$—$Yb_2O_3$ is formed in the removed portion 13a where the topcoat layer 13 has been removed, the durability can be improved compared to a conventional topcoat layer 13.

(Embodiment 3)

Referring to FIGS. 3A to 3D, explanation will be made. Like reference numerals are used to designate like structural elements corresponding to those like in FIGS. 1A to 1D and any further explanation is omitted for brevity's sake.

Figure 3A:
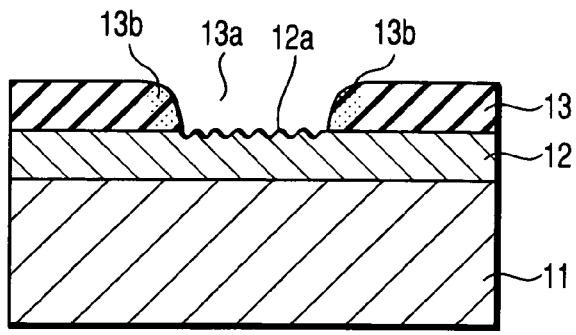
FIGS. 3A to 3D illustrate a method of repairing a Ni-based alloy part according to Embodiment 3 of the present invention, in accordance with order of repairing steps.
Figure 3B:
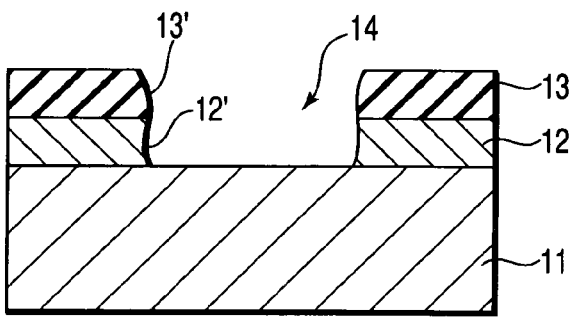
Figure 3C:
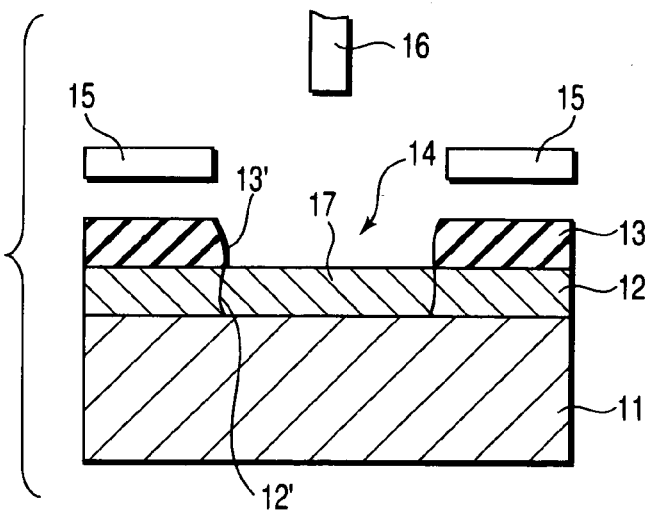
Figure 3D:
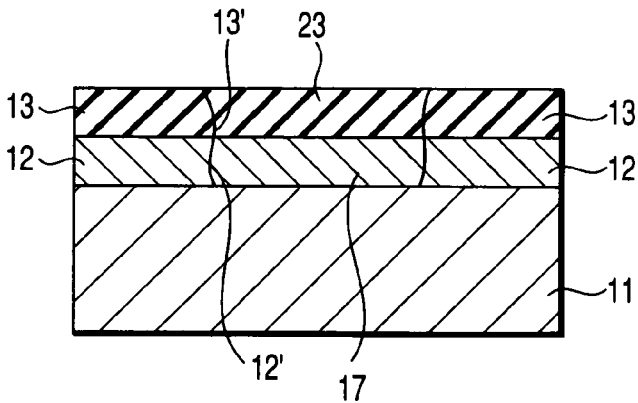
Figure 4:
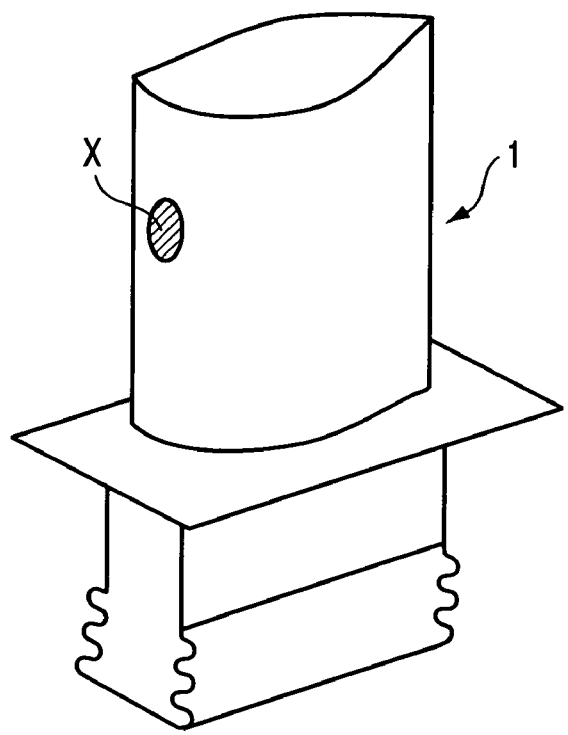
FIG. 4 illustrates a rotor blade of a gas turbine having a damaged portion.
Figure 5:
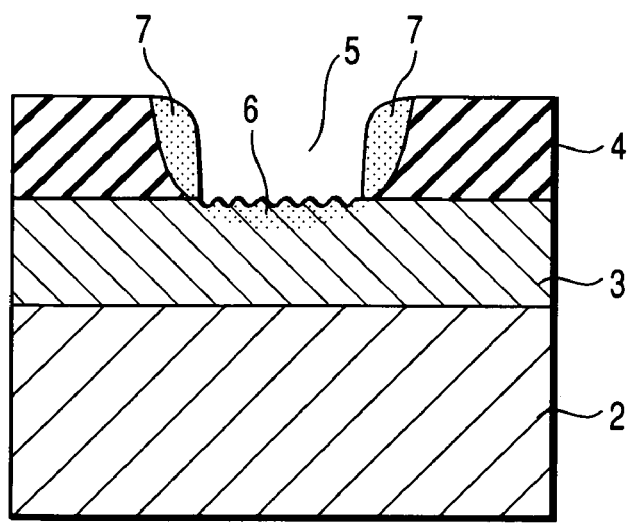
FIG. 5 illustrates a conventional method of repairing a Ni-based alloy part.

Similarly to Embodiment 1, as shown in FIG. 3A, an undercoat layer 12, which has a denatured portion 12a, is formed on a base material 11 and a topcoat layer 13, which has a peeled-off portion (removed portion) 13a and a damaged portion 13b surrounding the removed portion 13a, is formed on the undercoat layer 12. The topcoat layer 13 is composed of $ZrO_2.8Y_2O_3$. From the structure in this state, the undercoat layer 12 corresponding to the peeled-off portion 13a and the damaged portion 13b of the undercoat layer 12 are selectively removed by grind-polishing to thereby form an opening portion 14 in the undercoat layer 12 and the topcoat layer 13 (see FIG. 3B).

Next, a masking material 15 having an opening corresponding to the opening portion 14 is arranged right upon the topcoat layer 13 and a plasma spray gun 16 is arranged right above the opening portion 14. Subsequently, plasma spraying is applied to the opening 14 in the atmosphere at a spray particle speed of 500 m/s and a base-material temperature of 150° C. to form a Co-based alloy layer, a CoNiCrAlY layer 17, in the removed portion 12' of the undercoat layer 12. In this way, the repair of the undercoat layer 12 is completed (see FIG. 3C). Furthermore, after the masking material 15 and the plasma spray gun 16 are removed, a topcoat layer 23 composed of $ZrO_2$—$Yb_2O_3$ in the removed portion 13' where the topcoat layer has been removed, was formed by the EB-PVD method. In this way, the repair of the topcoat layer 23 is completed (see FIG. 3D).

According to Embodiment 3, similar to Embodiment 1, since further coating of the entire rotor blade is not required as is in the art, the durability of the undercoat layer 12 and the topcoat layer 23 can be improved. In addition, since the topcoat layer 23 is formed by the EB-PVD method, the durability of the top coat layer 23 can be further increased.

What is claimed is:

1. A method of repairing a Ni-based alloy part having an undercoat layer and a topcoat layer stacked on a Ni-based alloy base when the topcoat layer is damaged, comprising the steps of:

removing a damaged portion of the topcoat layer without removing all of the topcoat layer and removing a denatured portion of the undercoat layer corresponding to the damaged portion;

forming another undercoat layer in a removed portion, where the original undercoat layer has been removed, by spraying; and forming another topcoat layer formed of $ZrO_2$-based ceramics only at a portion where the topcoat layer has been damaged, wherein said topcoat layer and said another topcoat layer are formed of different materials, and wherein said undercoat layer is formed of Co-based MCrAlY, and said another undercoat layer is formed of a Ni-based MCrAlY having oxidation resistance.

2. The method of repairing a Ni-based alloy part according to claim 1, wherein another topcoat layer is formed in the removed portion of the topcoat layer by an electron beam physical vapor deposition method.

3. The method of repairing a Ni-based alloy part according to claim 1, wherein said topcoat layer is formed of $ZrO_2$-$8Y_2O_3$ and said another topcoat layer is formed of $ZrO_2$—$Dy_2O_3$ or $ZrO_2$—$Yb_2O_3$ having oxidation resistance.

4. A method of repairing a Ni-based alloy part having an undercoat layer and a topcoat layer stacked on a Ni-based alloy base when the topcoat layer is damaged, comprising the steps of:

removing a damaged portion of the topcoat layer without removing all of the topcoat layer and removing a denatured portion of the undercoat layer corresponding to the damaged portion;

applying spray to a removed portion, where the undercoat layer has been removed, to form another undercoat layer at reduced pressure, a spray particle speed of less than 300 m/s, and a base-material temperature of 600° C. or less; and forming another topcoat layer formed of $ZrO_2$-based ceramics only at the damaged portion of the topcoat layer, wherein said topcoat layer and said another topcoat layer are formed of different materials, and wherein said undercoat layer is formed of Co-based MCrAlY, and said another undercoat layer is formed of a Ni-based MCrAlY having oxidation resistance.

5. The method of repairing a Ni-based alloy part according to claim 4, wherein the another topcoat layer is formed in the removed portion of the topcoat layer by an electron beam physical vapor deposition method.

6. The method of repairing a Ni-based alloy part according to claim 4, wherein said topcoat layer is formed of $ZrO_2$-$8Y_2O_3$ and said another topcoat layer is formed of $ZrO_2$—$Dy_2O_3$ or $ZrO_2$—$Yb_2O_3$ having oxidation resistance.

7. A method of repairing a Ni-based alloy part having an undercoat layer and a topcoat layer stacked on a Ni-based alloy base when the topcoat layer is damaged, comprising the steps of:

removing a damaged portion of the topcoat layer without removing all of the topcoat layer and removing denatured portion of the undercoat layer corresponding to the damaged portion;

applying spray to a removed portion, where the undercoat layer has been removed, to form another undercoat layer in the atmosphere at a spray particle speed of 300 m/s or more and a base-material temperature of 300° C. or less; and forming another topcoat layer formed of $ZrO_2$-based ceramics only at a portion where the topcoat layer has been damaged, wherein said topcoat layer and said another topcoat layer are formed of different materials, and wherein said undercoat layer is formed of Co-based MCrAlY, and said another undercoat layer is formed of a Ni-based MCrAlY having oxidation resistance.

8. The method of repairing a Ni-based alloy part according to claim 7, wherein spraying is applied to the removed portion where the undercoat layer has been removed, followed by forming another topcoat layer in the removed portion of the topcoat layer by an electron beam physical vapor deposition method.

9. The method of repairing a Ni-based alloy part according to claim 7, wherein said topcoat layer is formed of $ZrO_2$-$8Y_2O_3$ and said another topcoat layer is formed of $ZrO_2$—$Dy_2O_3$ or $ZrO_2$—$Yb_2O_3$ having oxidation resistance.

* * * * *